Patented July 19, 1949

2,476,508

UNITED STATES PATENT OFFICE 2,476,508

SYPHILOTHERAPY AGENT

George W. Raiziss, Marie Severac, and Le Roy W. Clemence, Philadelphia, Pa., assignors to Abbott Laboratories, North Chicago, Ill., a corporation of Illinois No Drawing. Application August 31, 1942, Serial No. 456,792

1 Claim. (Cl. 167—69)

The present invention relates to medicinal compositions and more particularly to an improved syphilotherapy agent and an improved method of preparing the same.

The use of certain organic-arsenic compounds in the treatment of diseases such as syphilis and the like is well known to the art. An example is the 3-amino-4-hydroxyphenylarsine oxide hydrochloride. Compounds of this type are characterized by high toxicity and the limitations on their use, e. g. repeated administrations of curative doses are also well known to the art. Many attempts have been made to discover an improved compound having low toxicity and high antisyphilitic activity. It is for this reason that extended research work has been carried on in this field.

The principal object of the present invention is to provide an improved antisyphilitic agent or agent for use in syphilotherapy.

Other objects will be apparent as the description proceeds hereinafter.

During the research investigation for the present invention it was found that the organic-arsenicals tested possessed high toxicities and that with the compounds showing any activity the ratio of the curative dose to the toxic dose was unsatisfactory or left much to be desired. In the investigation many pharmacological tests proved necessary as it was found that minor changes in molecular structure often produced drastic changes in therapeutic properties. With continued investigation it was discovered that 2-pyridone-5-arsenoxide possessed high antisyphilitic activity and that it was characterized by a comparatively low toxicity.

The 2-pyridone-5-arsenoxide was first described in the literature as the tautomeric form 2-hydroxy-5-pyridine-arsenoxide. Arsenic compounds and particularly the arsenoxides are inherently toxic and it was considered that this compound possessed the usual high arsenoxide toxicity. The discoveries of the present invention, i. e. that the pyridone compound possessed high antisyphilitic activity coupled with an unexpected and unusually low toxicity make available to the art an improved agent for use in syphilotherapy. An illustrative method for preparing the pyridone compound is as follows:

Example

About 90 parts of 2-pyridone-5-arsonic acid are dissolved in about 2800 parts of warm water and the solution cooled to about 20° C. About 24 parts of potassium iodide are added to the cooled solution and after further cooling to about 15° C. sulfuric acid is added, e. g. 5 cc. 60% $H_2SO_4$ per 24 grams of KI. Sulfur dioxide is next passed through the solution for about three hours and if a slight crystallization takes place during this period additional sulfur dioxide is introduced until the precipitate dissolves. The reaction mixture is then cooled to about 0°-5° C. mechanically stirred for about two hours, and the excess sulfur dioxide removed by applying vacuum first at the cooled temperature and then at room temperature.

Concentrated ammonium hydroxide is next added to provide a pH of about 7.1 and the resulting reaction solution evaporated to dryness under high vacuum. The residue is then triturated with about 100 parts of water and the container or flask washed out with an additional 50 parts of water. The combined solution, which possesses an acid pH of about 4.6 and is milky in appearance with an oily layer, is then cooled and concentrated ammonium hydroxide added until a pH of about 8.2-8.4 is obtained. The white crystalline precipitate formed which becomes heavier on stirring and standing, is filtered off by suction and then washed with 200 parts of water, then 120 parts alcohol and finally with about 75 parts of ether. The desired product after drying in vacuo is obtained in pure form with a melting point of about 256°-260° C.

The process of preparing the 2-pyridone-5-arsenoxide described above including the removal of excess sulfur dioxide by vacuum and the pH control is preferred for purposes of the present invention. The taking up of the residue in water and the adjusting of the pH of the resulting mixture to 8.2-8.4 by means of ammonium hydroxide has been found particularly important as it gives a high yield of a pure uniform product of the type desired for use in the therapeutic field.

The 2-pyridone-5-arsenoxide prepared as above is slightly soluble in water, soluble in dilute acids and dilute alkalies including sodium carbonate solutions. It is stable and does not oxidize readily upon exposure to air. For administration it may be compounded as follows: 3 parts 2-pyridone-5-arsenoxide with 1 part of solid sodium carbonate. This mixture which may be dispensed in ampules is soluble and permits administration by single solution upon addition of sterile water.

For intramuscular administration the 2-pyridone-5-arsenoxide may be suspended in vegetable oil, e. g. a dose of 60 mg. in peanut oil, olive oil, etc. Clinical investigations indicate that intramuscular (as distinguished from intravenous)

administration is much preferred both from the standpoint of therapeutic results and toleration. This is a unique and important property of the 2-pyridone compound of the present invention. Prior art compounds of the arsenoxide type are generally used intravenously and are not recommended for intramuscular injection due to poor toleration by patients.

The unique properties which make the pyridone compound adaptable for intramuscular administration have been found of utmost importance by the medical profession. These properties, as will be apparent to those skilled in the art, permit controlled, steady or continuous applications of the therapeutic and are much preferred over the so called "flash" or intermittent applications obtained by intravenous administration.

It will be understood that the present invention is not limited to the above illustrative example. The scope of the present invention accordingly is to be determined by the claim annexed hereto.

We claim:

A medicinal composition for intramuscular administration consisting essentially of a substantially pure 2-pyridone-5-arsenoxide suspended in a vegetable oil, said composition being characterized by high anti-syphilitic activity and relatively low toxicity.

GEORGE W. RAIZISS.
MARIE SEVERAC.
LE ROY W. CLEMENCE.

REFERENCES CITED

The following references are of record in the file of this patent:

UNITED STATES PATENTS

| Number | Name | Date |
|---|---|---|
| 1,661,871 | Binz et al. | Mar. 6, 1928 |
| 2,092,036 | Tatum | Sept. 7, 1937 |
| 2,209,876 | Ewins | July 30, 1940 |
| 2,221,817 | Scott | Nov. 19, 1940 |

FOREIGN PATENTS

| Number | Country | Date |
|---|---|---|
| 24,480 | Great Britain | 1910 |

OTHER REFERENCES

Sollmann: Manual Pharmacology, 6th ed. (1942), page 36.